United States Patent [19]

Krueger

[11] 3,854,390
[45] Dec. 17, 1974

[54] HYDROMAGNETIC WATER CONTROL FOR AUTOMATIC COFFEE BREWER

[75] Inventor: Harvey R. Krueger, Dundee, Ill.

[73] Assignee: Reynolds Products, Inc., Schaumburg, Ill.

[22] Filed: Oct. 17, 1973

[21] Appl. No.: 407,300

[52] U.S. Cl. ................................................ 99/307
[51] Int. Cl. ............................ A23f 1/00, A23f 1/08
[58] Field of Search ...... 99/300, 302, 307; 137/412, 137/414, 416; 251/65

[56] References Cited
UNITED STATES PATENTS
2,752,936  7/1956  Cantalupo ........................... 137/414
3,279,494  10/1966  Nixon ................................. 137/416

Primary Examiner—Harvey C. Hornsby
Assistant Examiner—Donald B. Massenberg
Attorney, Agent, or Firm—Shenier & O'Connor

[57] ABSTRACT

A hot water supply system for a coffee maker of the type in which a predetermined quantity of hot water is sprayed over ground coffee contained in a brew basket wherein cold water is adapted to be admitted into a hot water tank by a normally closed inlet valve having an actuator of magnetic material which is picked up by a float-carried magnet upon manual actuation of the float to open the inlet valve and which actuator is automatically released to close the inlet valve when the float moves under the influence of incoming water to a position corresponding to a volume of incoming water equal to the charge of hot water to be sprayed over the coffee. A hot water dump valve comprising a movable siphon cap on the hot water discharge tube is operated alternatively by hydraulic differential pressure means or by magnetic means when the inlet valve opens to prevent outflow of hot water while cold water is being fed to the tank and thereafter is released as the inlet valve closes to permit hot water to flow out of the tank.

15 Claims, 7 Drawing Figures

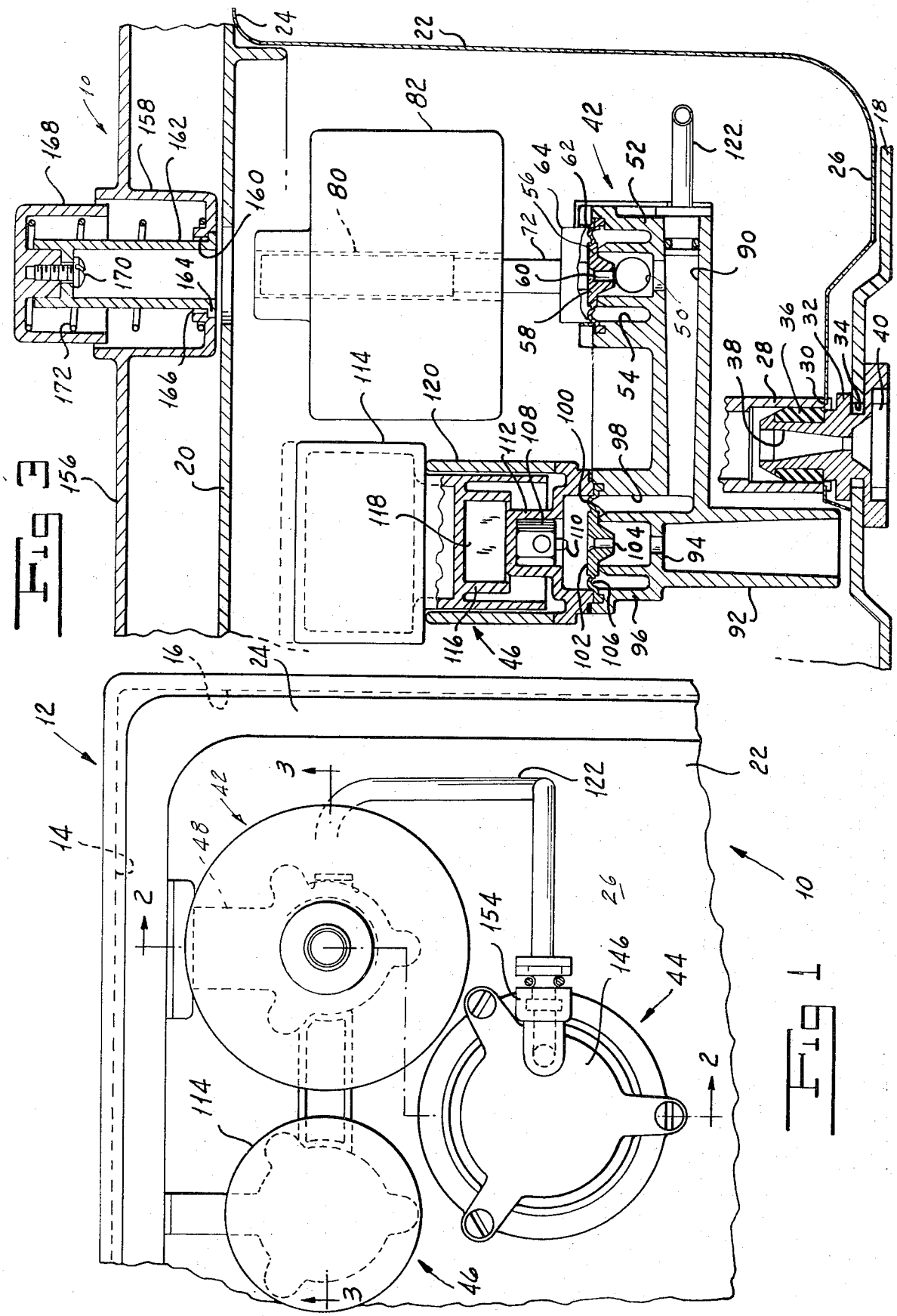

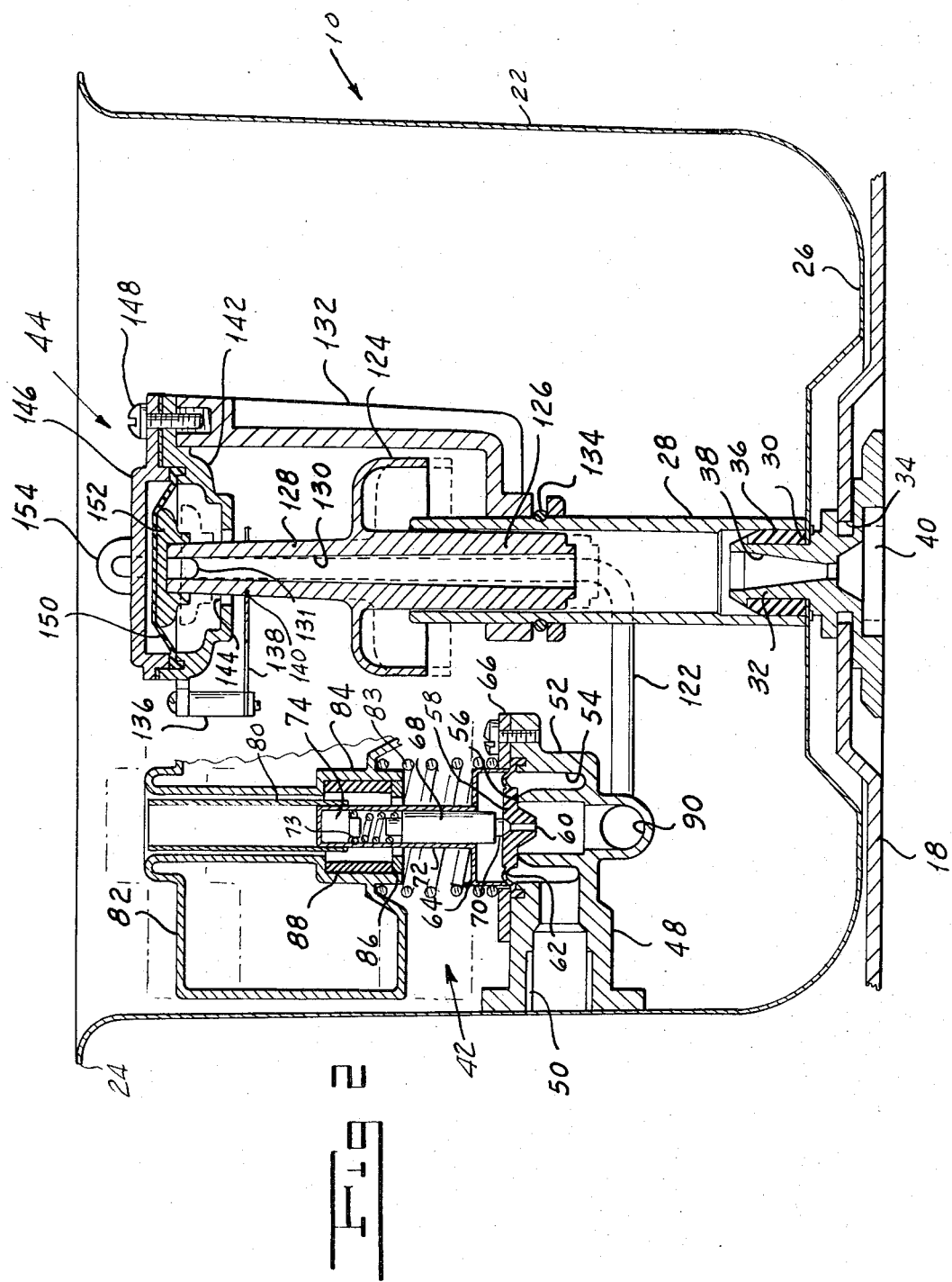

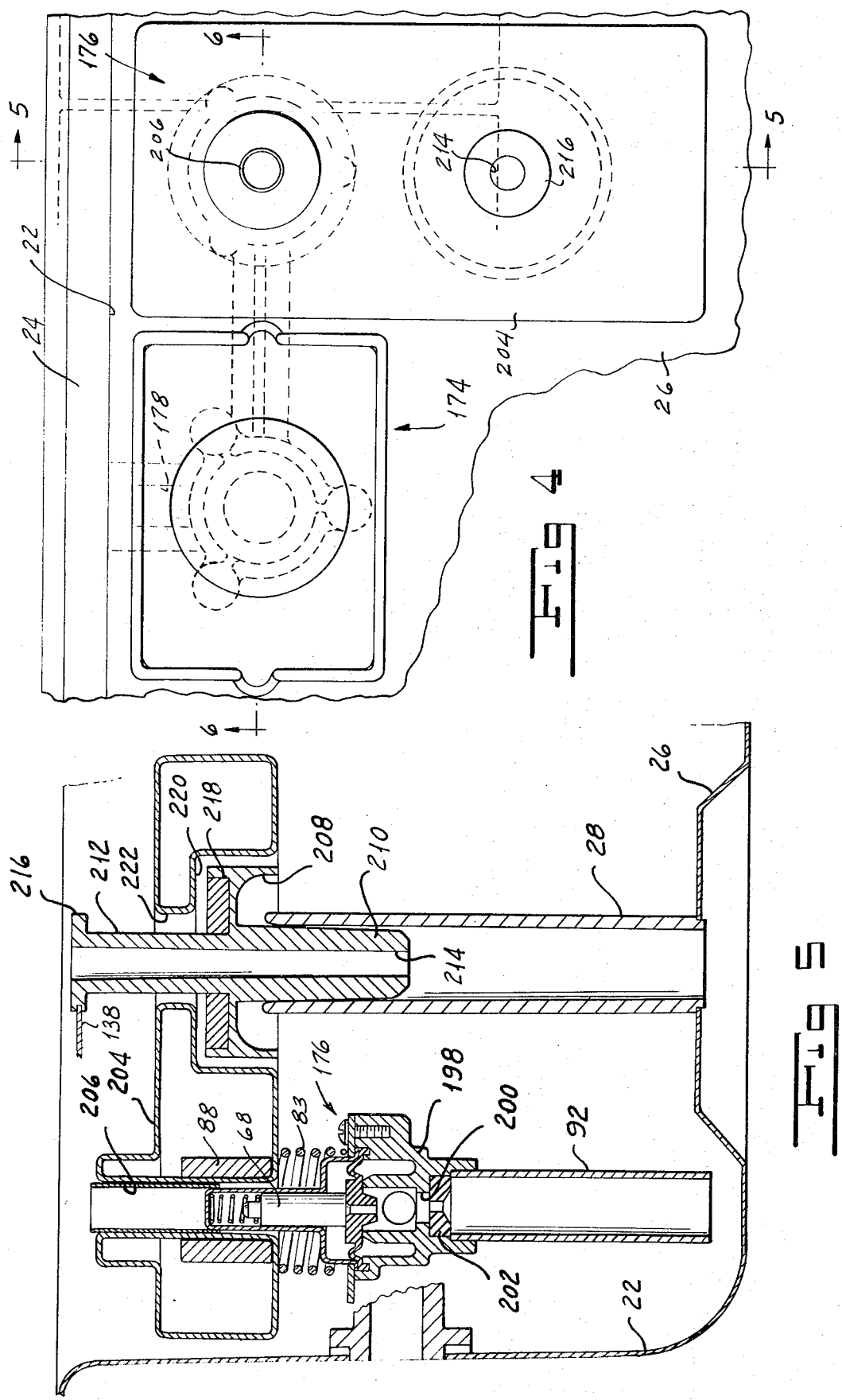

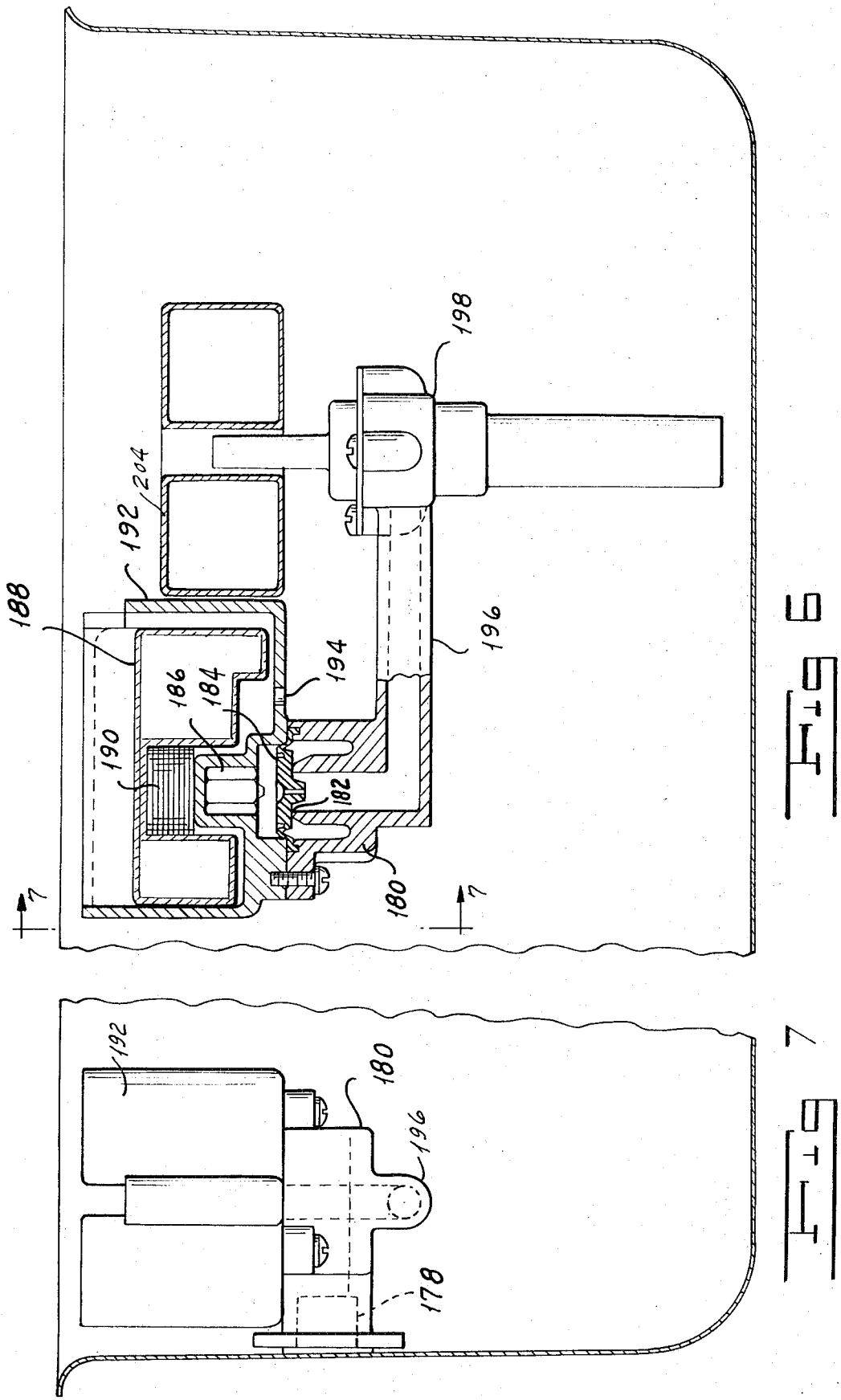

3,854,390

HYDROMAGNETIC WATER CONTROL FOR AUTOMATIC COFFEE BREWER

BACKGROUND OF THE INVENTION

There are known in the prior art coffee makers of the pour-in type in which a beaker of cold water is introduced into a hot water tank adjacent to the bottom thereof thus to displace a quantity of hot water upwardly in the tank to be discharged from the tank and sprayed over a charge of ground coffee contained in a brew basket. The quantity of hot water discharged from the tank is substantially equal to the amount of cold water introduced into the tank so that a full beaker of coffee is brewed. Attempts have been made in the prior art to automate coffee brewers of this type. More particularly, in the prior art automatic control of the water flow is achieved by incorporating various electrical devices such as electrically operating water valves, timers, latching relays and switch-type water level controls in the apparatus.

The use of electrical control devices in coffee brewers decreases the reliability of water control. Not only is it desirable that an automatic coffee brewer of the type described be provided but also it is desirable that existing brewers which heretofore have been operated manually be able to be converted to an automatic operation. The existing electrical systems do not lend themselves to changing a manually operated brewer to an automatic brewer. In addition, the electrically operating automatic brewers can only be employed at installations whereat electrical power is available.

I have invented a hydromagnetic water control system for an automatic coffee brewer which overcomes the defects of electrical control systems of the prior art. My system does not require a source of electrical power for its operation. It readily adapts itself to conversion of manually operable brewers to automatic operations. It is simpler in construction and less expensive to operate than are automatic brewers of the type known in the art.

SUMMARY OF THE INVENTION

One object of my invention is to provide a hydromagnetic water control for an automatic coffee brewer.

Another object of my invention is to provide a hydromagnetic water control for an automatic coffee brewer which overcomes the disadvantages of electrical controls of the prior art.

A further object of my invention is to provide a hydromagnetic water control for an automatic coffee brewer which does not require a source of electrical power.

Still another object of my invention is to provide a hydromagnetic water control for an automatic coffee brewer which readily adapts itself to conversion of existing manually operable brewers to automatic operation.

A still further object of my invention is to provide a hydromagnetic water control for an automatic coffee brewer which is simple in construction.

Still another object of my invention is to provide a hydromagnetic water control for an automatic coffee brewer which is inexpensive to operate.

Other and further objects of my invention will appear from the following description.

In general my invention contemplates the provision of a hot water supply system for a coffee brewer in which a float disposed in a hot water tank is adapted to be depressed manually to cause a magnet on the float to pick up the actuator of a cold water inlet valve to open the valve until a predetermined quantity of cold water ha been admitted into the tank to move the float to a position at which the valve actuator is released to close the valve. I provide a hot water dump valve comprising a movable siphon cap on the hot water discharge tube which dump valve may be closed alternatively by hydraulic differential pressure means or by magnetic means as the inlet valve opens to prevent the outflow of water during the period of time for which cold water is being fed to the tank while being automatically released thereafter to permit hot water to flow out of the tank to the spray head located over the brew basket.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a fragmentary top plan view of a brewer incorporating my hydromagnetic water control with the cover removed.

FIG. 2 is a sectional view of the brewer shown in FIG. 1 taken along the line 2—2 of FIG. 1.

FIG. 3 is a fragmentary sectional view of the brewer shown in FIG. 1 taken along the line 3—3 of FIG. 1.

FIG. 4 is a fragmentary top plan view of a brewer incorporating an alternate form of my hydromagnetic water control system.

FIG. 5 is a fragmentary sectional view of the brewer shown in FIG. 4 taken along the line 5—5 thereof.

FIG. 6 is a fragmentary sectional view of the brewer shown in FIG. 4 taken along the line 6—6 thereof.

FIG. 7 is a fragmentary side elevation of the portion of my hydromagnetic water control system illustrated in FIG. 6 taken along the line 7—7 of FIG. 6.

DESCRIPTION OF THE PREFERRED EMBODIMENT

Referring now to FIGS. 1 to 3, a coffee brewer indicated generally by the reference character 10, incorporating one form of my hydromagnetic water control, includes a housing, indicated generally by the reference character 12, having sides 14 and 16, a base 18, and a cover 20. A hot water tank 22 is formed with a peripheral lip 24 adapted to rest on a suitable support on the upper edge of the housing 10. Tank 22 has a base 26 provided with an outlet opening 30 in which the hot water outlet tube 28 of the system is mounted. A spray head support fitting 32 is detachably mounted in an opening 34 in the base 18 of the machine housing. A seal 36 on the upper end of the fitting 32 is adapted to be received in the interior of the hot water outlet tube 28. A tapered passage 38 in the fitting 32 is adapted to conduct hot water to a spray head deflector 40 mounted in the fitting 32. This assembly of the spray head and its fitting is more fully described in the copending application of Neumann et al., Ser. No. 374,475, filed June 28, 1973.

The form of my hydromagnetic control system illustrated in FIGS. 1 to 3 includes an inlet valve assembly, indicated generally by the reference character 42, a dump valve arrangement, indicated generally by the reference character 44, and an overflow control valve assembly, indicated generally by the reference character 46. An inlet fitting 48 carried by the wall of the tank 22 is formed with an inlet passage 50 adapted to be connected to a suitable source of potable water. Passage 50 communicates with the interior of a valve body 52 having a valve chamber 54 and means forming a seat 56 adapted to be engaged by a valve 58 having a central aperture 60 and a surrounding flexible diaphragm 62 having a pair of small perforations therein. A cap 64 is held onto the body 52 by means of a retainer plate 66. Cap 64 is formed with an upward extension which slidably receives a plunger 68 having a tapered tip 70 which is adapted to seat at the upper end of the passage 60. The extension 72 on cap 64 provides a guide for the plunger 68 which is normally urged into engagement with valve 58 by a spring 73.

When, in a manner to be described, the plunger moves upwardly, ultimately it strikes a stop 74 at the top of the extension 72 to be released for repositioning under the action of spring 73. As is known in the art, when plunger 68 is lifted water flows out of passage 60 at the rate at which it is admitted to the portion of the chamber 54 above valve 58 by the perforations in diaphragm 62 so that the pressure of incoming water lifts the valve 58 off the seat 56 to permit incoming water to flow directly past the seat 56.

A float guide 80 extending upwardly from the plunger guide extension 72 receives a float 82 for vertical sliding movement. A magnet housing 84 formed on the bottom of the float 82 receives a magnet 88 which is retained in the housing by a retainer 86. Float 82 is normally urged by a spring 83 to a neutral position indicated in full lines in FIG. 2 and is adapted to be manually moved downwardly to a lower position shown in dot-dash lines in FIG. 2 at which the magnet 88 picks up the plunger 68 so that when the float is released it moves the plunger 68 away from the valve 58 to permit the valve to open.

When the inlet valve 42 is opened, water is admitted past the seat 56 into a passage 90 leading to the cold water fill tube 92 of the assembly. In the course of its movement from passage 90 to the tube 92, the water passes through a flow restrictor 94. I interpose the overflow valve assembly 46 between the passage 90 and the flow restrictor 94. This assembly 46 includes a housing 96, forming a valve chamber 98, in which I provide a seat 100 for a valve 102 having a central orifice and a flexible perforated peripheral portion 106 supported on the housing 96. A plunger 108 having a tip 110 is adapted to be received in a recess 112 formed in the upper portion of the valve body above the valve 102. A float 114 formed with a magnetic housing 116 carrying a magnet 118 is received in a guide 120. As long as the water within the tank is not above a predetermined level the magnet 118 holds the plunger 108 in housing 112 so that the valve 46 is open. When the water reaches a predetermined high level, the float 114 moves upwardly with relation to the guide 120 to an upper position indicated in dot-dash lines in FIG. 2 and magnet 118 releases plunger 108 to close the valve 46.

A line 122 is adapted to connect the passage 90 to the dump valve actuated structure 44. My assembly includes a siphon cap 124 forming a part of the dump valve arrangement. Cap 124 includes a downwardly extending guide portion 126 adapted to be received in the hot water outlet tube 28. The siphon cap 124 is adapted to move between a full line position shown in FIG. 2 in which water is permitted to flow through the space between the guide extension 126 and the inner wall of the tube 28 and a broken line position at which the extension 126 forms a seal with the inner wall of tube 28 so as to prevent the outflow of hot water.

I form the siphon cap 24 with an upwardly extending actuator portion 128. A bore 130 extending through portions 126 and 128 permits trapped air to escape from tube 28 through a pair of notches 131 at the top of extension 128.

A bracket 132 secured on the tube 28 by a snap ring 134 or the like supports a spacer 136 carrying a leaf spring 138 which engages in a groove 140 in extension 128 resiliently to support siphon cap 124 in the full line position shown in FIG. 2. A lower dump valve actuator housing 142 is formed with an opening 144 in the base thereof through which the extension 128 passes. The dump valve actuator assembly includes an upper housing portion 146 which is assembled with the lower housing portion by any suitable means such, for example, as by screws 148. A diaphragm 150 of a suitable flexible material extends across the space between the two housing halves 142 and 146 and carries an actuator 152 adapted to engage the upper end of extension 128. A suitable fitting 154 connects the line 122 to the interior of the upper housing half 146. As will be described more fully hereinbelow, when the inlet valve assembly 42 is open to permit cold water to flow to outlet pipe 92 past flow restrictor 94, the flow restrictor creates a back pressure which through line 122 is applied to diaphragm 150 to move the diaphragm downwardly to cause the siphon tube 124 to move to the broken line position shown in FIG. 2 to prevent the outflow of hot water for the period of time during which cold water is being fed into the tank.

I form a support plate 156 carried by the cover 20 with a spring housing 158 the bottom of which is formed with an opening 160. A plunger 162 is provided with a flange 164 at the lower end thereof adapted to engage a shoulder 166. A push button 168 secured to the plunger 162 by any suitable means such as by a screw 170 receives the upper end of a spring 172 which urges the push button 168 and plunger 162 to the position shown in FIG. 3. From that position, the push button can be operated to move the plunger downwardly to engage the float 82 to move it to a position at which the magnet 88 can pick up the armature 68.

Referring now to FIGS. 4 to 7, I have shown an alternate embodiment of my hydromagnetic water control system which employs a magnetic means rather than the differential hydraulic pressure means for operating the siphon cap to control the operation of the apparatus in discharging hot water. This form of my invention includes an overflow control valve assembly, indicated generally by the reference character 174, and an inlet valve assembly indicated generally by the reference character 176. In this arrangement, water from a suitable supply is admitted first to the overflow control valve assembly 174 through a fitting 178 leading into the housing 180 of the overflow control valve. This valve includes a seat 182, a valve 184, a plug 186 normally held in a position away from the valve by a magnet 190 carried by a float 188. Float 188 is mounted for movement in a guide housing 192 having an opening 194 in the base thereof to admit water from the tank into the housing 192. The operation of this overflow valve assembly is substantially the same as that of the overflow valve assembly 46 illustrated in FIGS. 1 to 3.

Cold water entering the system through the overflow valve 174 enters a passage 196 leading to the inlet valve 176. The structure of the inlet valve 176 is similar to that of the inlet valve 42 of the form of my invention illustrated in FIGS. 1 to 3. The housing 198 thereof receives water from line 196 and, when the valve is open, permits the water to flow outwardly through an opening 200 in housing 198 to a flow restrictor 202 communicating with the cold water inlet tube 92. The float 204 of the form of my invention illustrated in FIGS. 4 to 7 differs somewhat from the float 82 of the form of my invention illustrated in FIGS. 1 to 3. Float 204 has a first passage 206 therethrough which receives the float guide 80.

The siphon cap 208 of the form of my invention illustrated in FIGS. 4 to 7 has a downward extension 210 which cooperates with the bore in the outlet pipe 208 alternatively to prevent outflow of water and to permit outflow. An upward extension 212 of the siphon cap 208 is formed with a flange 216 for a reason to be described hereinbelow. I mount a magnet 218 in the siphon cap 208 for cooperation with the outlet pipe 28 which, in this form of my invention, is made of magnetic material.

I form the float 204 with a recess 220 in the underside thereof which normally receives the siphon cap 208 in a position at which it permits water to flow outwardly through the space between extension 210 and the inner wall of outlet 228. The extension 212 extends upwardly through an opening 222 in the float communicating with the recess 220.

In operation of the form of my coffee brewer illustrated in FIGS. 1 to 3, when it is desired to brew a fresh batch of coffee a brewing basket containing a charge of ground coffee is placed in position below the spray head 40 in a manner known to the art. Next the push button 168 is depressed to cause plunger 162 to engage the float 82 to move it from the full line position illustrated in FIG. 2 to the lower broken line position. When that occurs the magnet 88 is positioned adjacent to the plunger 68 of magnetic material so that when the push button 168 is released, float 82 moves upwardly under the action of spring 83 and carries the plunger 68 upwardly to move it away from the valve 58. The pressure of incoming water lifts the valve 58 away from its seat 56 so that the water flows over the seat and into the passage 90. Water from the passage 90 flows past the overflow control valve assembly 46 and through the flow restrictor 94 to the cold water inlet tube 92. Owing to the presence of flow restrictor 94, a back pressure develops which is applied by line 122 to the interior of cap 146 over diaphragm 150. This back pressure moves the diaphragm downwardly together with actuator 152 to move the siphon cap 124 downwardly against the action of spring 138. As this occurs the downwardly extending portion 126 of the siphon cap forms a seal with the wall of the hot water discharge tube 28 to prevent the outflow of hot water.

As the cold water flows into the tank 22 adjacent to the bottom 26 thereof, it displaces hot water upwardly. As the level of water in the tank 22 rises, float 82 moves upwardly carrying the plunger 83 therewith. At a predetermined level of water within the tank 22 float 82 will have reached the upper position indicated in dot-dash lines in FIG. 2, at which time the plunger 68 strikes the stop 74 so that the plunger is released. When the plunger is released, spring 73 moves it downwardly and into engagement with the valve 56 to close the valve to cut off the flow of incoming water. At the same time the back pressure in line 122 drops to permit spring 138 to restore the siphon cap to the full line position illustrated in FIG. 2. In this position of the siphon cap hot water is permitted to flow outwardly through the space between the downward extension 126 and the inner wall of tube 128. This hot water passes outwardly through the spray head 40 which distributes it over the charge of ground coffee in the brew basket. The outflow of hot water continues until the level of water reaches the lower edge of the siphon cap 124.

The operation of the form of my brewer illustrated in FIGS. 4 to 6 is similar to that of the form of the brewer illustrated in FIGS. 1 to 3. When it is desired to brew a batch of coffee, the brew basket carrying a fresh charge of ground coffee is placed in position. Next the float 204 is moved downwardly as by a push button similar to that illustrated in connection with FIGS. 1 to 3. When the float is released, the inlet valve 176 is opened in the same manner as that described in connection with FIGS. 1 to 3. When the float was pressed downwardly to the siphon cap 208 likewise was depressed to a position at which the downward extension 210 formed a seal with the inner wall of outlet tube 28. When the float is released the magnet 218 cooperating with the tube 28 which is formed of magnetic material holds the siphon cap in its depressed position. As cold water flows inwardly into the tank 22, the level of water therein rises carrying the float 204 upwardly until the plunger 68 is released to permit the inlet valve 176 to close. At substantially the same time the float engages an abutment 216 on the top of extension 212 to release the siphon cap 208 to permit a charge of hot water to flow outwardly through the space between the extension 210 and the inner wall of tube 28.

In each of the forms of my invention, if for any reason a malfunction causes the level of water in the tank 22 to rise above a predetermined high level, either the overflow valve assembly 46 of FIGS. 1 to 3, or the overflow valve assembly 174 of FIGS. 4 to 7 operates to close the overflow valve to shut off the flow of water.

It will be seen that I have accomplished the objects of my invention. I have provided a hydromagnetic water control system for an automatic coffee brewer. I have provided an automatic coffee brewer which does not require a source of electrical power for its operation. My system overcomes the disadvantages of coffee brewers of the prior art incorporating electrical controls. My water supply system readily lends itself to conversion of manually operated coffee brewers to automatic operation. It is simple in construction and is inexpensive to operate.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is,

Having thus described my invention, what I claim is:

1. Apparatus for controlling the flow of cold water into and the flow of hot water out of a storage tank of an automatic coffee brewer including in combination, a storage tank having inlet and outlet means, means including a normally closed inlet valve connected to said inlet means opening to admit cold water into said tank, means including a normally open outlet valve connected to said outlet means permitting hot water to flow out of said tank, a float carried in said tank being operatively connected to said inlet valve, said float being movable manually from a first position downwardly to a second position, means normally urging said float to said first position, means responsive to said manual movement of said float to said second position opening said inlet valve under the influence of said urging means, means for closing said outlet valve concomitantly with opening of said inlet valve, and means responsive to movement of said float under the influence of incoming cold water moving said float to a third position and concomitantly closing said inlet valve and opening said outlet valve.

2. Apparatus as in claim 1 in which said means responsive to movement of said float for opening said inlet valve comprises magnetic means.

3. Apparatus as in claim 2 in which said magnetic means comprises a member of magnetic material forming the actuating element of said inlet valve and a magnet carried by said float.

4. Apparatus as in claim 1 in which said means for closing said outlet valve comprises hydraulic differential pressure means.

5. Apparatus as in claim 4 in which said outlet valve means comprises an outlet tube and a member mounted for movement relative to said tube for movement between a closed position at which it prevents flow of water out of said tube and an open position at which it permits flow of water out of said tube.

6. Apparatus as in claim 5 in which said differential pressure means comprises means responsive to opening of said inlet valve for producing a back pressure and means responsive to said back pressure for moving said outlet valve member to said closed position.

7. Apparatus as in claim 6 including a siphon cap associated with said outlet tube, said outlet valve member comprising an extension on said siphon cap disposed in said tube.

8. Apparatus as in claim 1 in which said means for closing said outlet valve comprises normally disengaged magnetic means.

9. Apparatus as in claim 8 in which said outlet valve closing means comprises means responsive to said movement of said float from said first to said second position for rendering said magnetic means active.

10. Apparatus as in claim 9 including means responsive to movement of said float to said third position for disengaging said magnetic means.

11. Apparatus as in claim 10 in which said outlet valve means comprises an outlet tube of magnetic material and a member mounted for movement relative to said outlet tube between an open position at which it permits flow of water out of said outlet tube and a closed position at which it prevents flow of water out of said outlet tube, and in which said magnetic means comprises said outlet tube and a magnet carried by said outlet valve member.

12. Apparatus as in claim 11 in which said disabling means comprises interengageable means on said float and on said member.

13. Apparatus for controlling the flow of cold water into and the flow of hot water out of the storage tank of an automatic coffee maker including in combination, a storage tank having a bottom formed with a discharge opening, a hot water outlet pipe extending from said discharge opening to a location above the bottom of said tank, a siphon cap associated with said outlet pipe, said siphon cap having a portion extending into said outlet pipe from the top thereof, said siphon cap being movable between a first position at which said portion permits flow of water into said pipe and a second position at which said portion closes the upper end of said pipe, means biasing said siphon cap to said first position, a normally closed valve comprising an actuator of magnetic material, a float, a magnet carried by said float, means mounting said float for movement from a first position at which said magnet and actuator are magnetically uncoupled to a second position at which said magnet and said actuator are magnetically coupled, means for biasing said float to said first position, manually operable means for moving said float from said first position to said second position against the action of said float-biasing means to open said inlet valve upon release of said float, means for moving said siphon cap to said second position against the action of said cap-biasing means concomitantly with opening of said inlet valve, and means responsive to movement of said float to a third position for uncoupling said magnet and said actuator to permit said inlet valve to close and for permitting said cap-biasing means to restore said cap to said first position thereof.

14. Apparatus as in claim 13 in which said siphon cap moving means comprises means responsive to opening of said inlet valve for producing a back pressure and means responsive to said back pressure for moving said siphon cap to said second position.

15. Apparatus as in claim 13 in which said means for moving said cap from said first position to said second position comprises first interengageable means on said float and on said cap, said outlet pipe having a portion of magnetic material, a magnet on said cap, and in which said means responsive to movement of said float to said third position comprises second interengageable means on said float and on said cap.

* * * * *